June 3, 1947.　　　E. H. MOAK　　　2,421,461
MULTIPLE SPINDLE MECHANISM
Filed Aug. 10, 1945　　　3 Sheets-Sheet 1
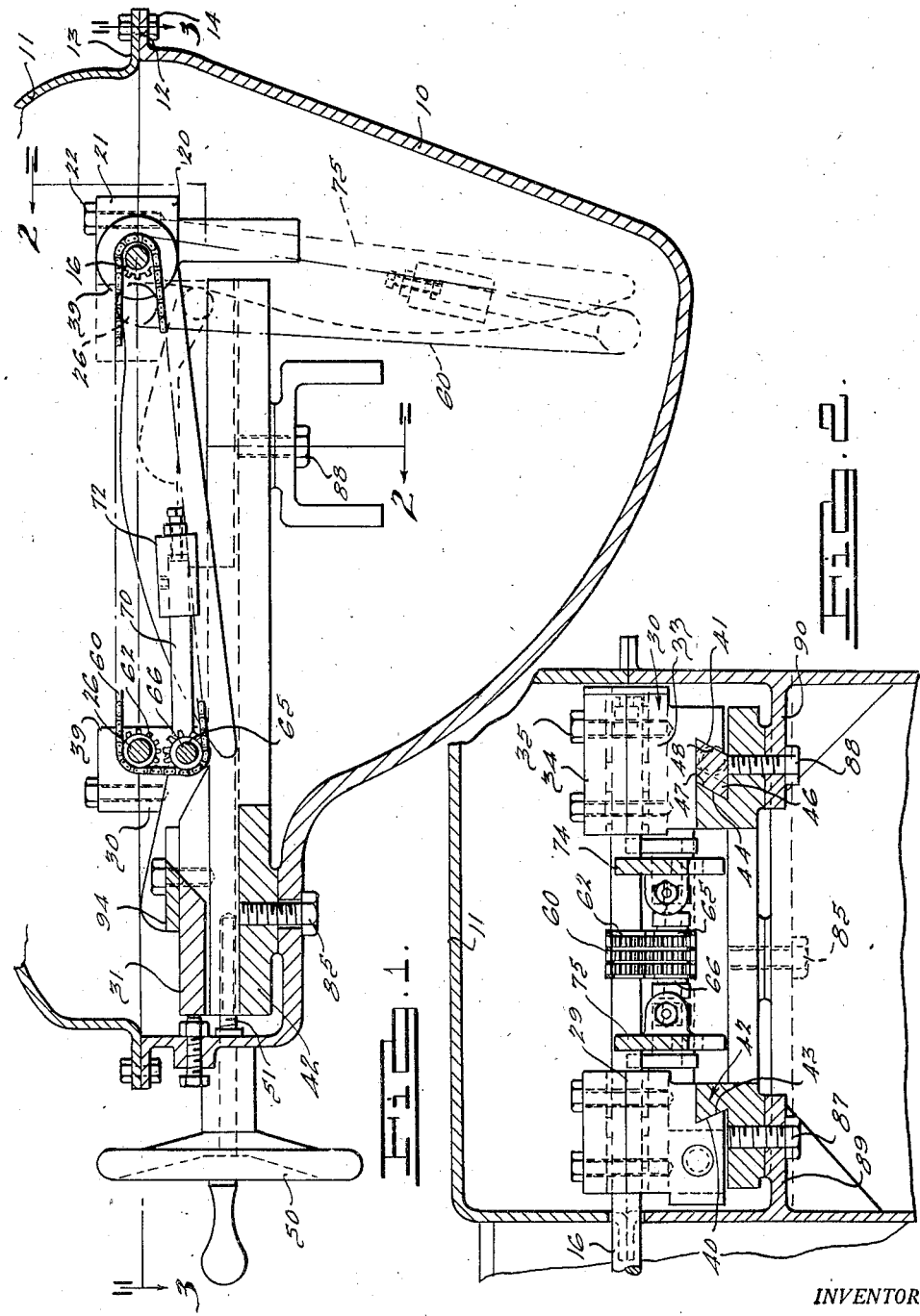
INVENTOR.
Eugene H. Moak.
BY
Harness, Dickey & Pierce.
ATTORNEYS.

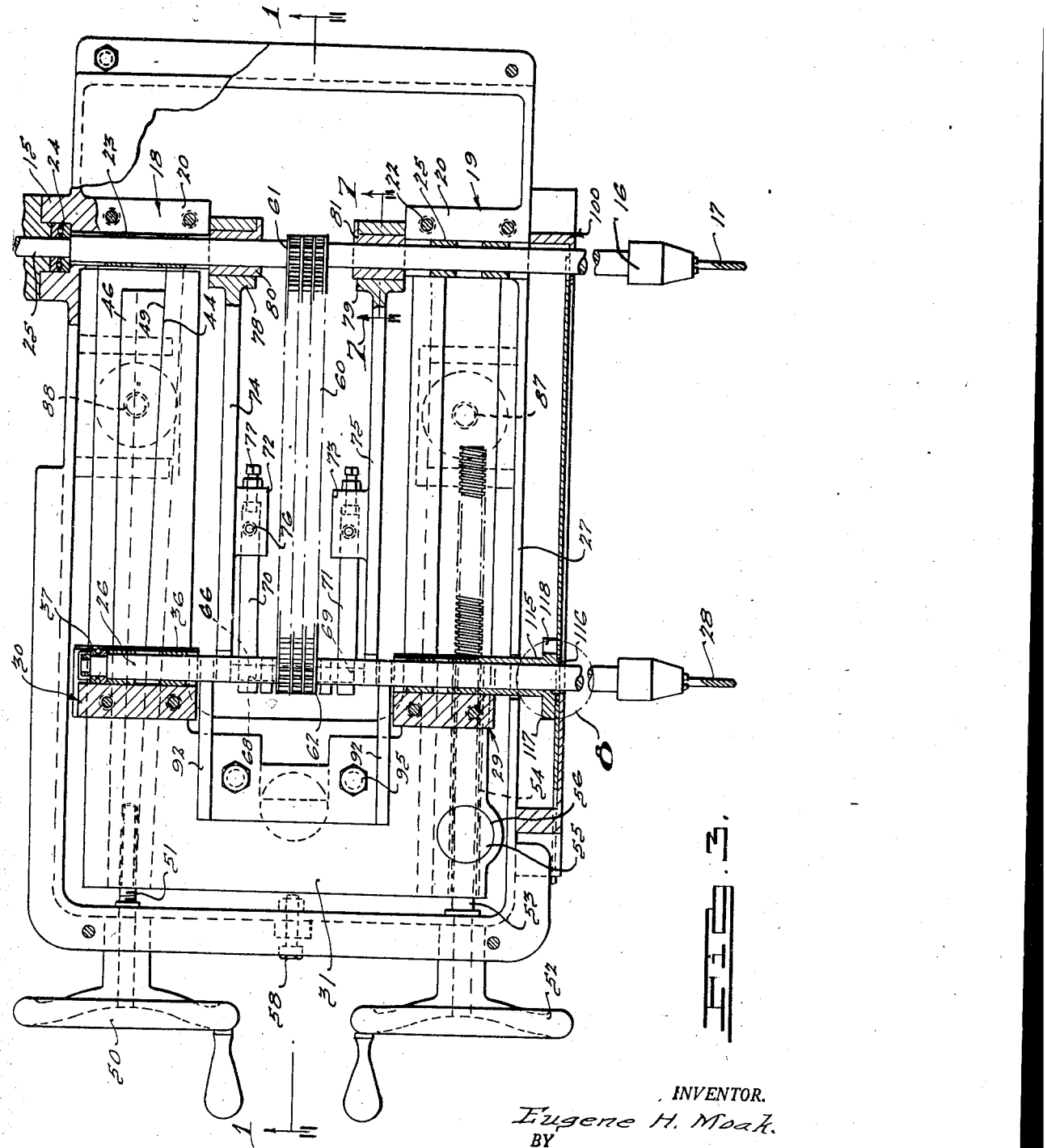

June 3, 1947.  E. H. MOAK  2,421,461
MULTIPLE SPINDLE MECHANISM
Filed Aug. 10, 1945  3 Sheets-Sheet 3
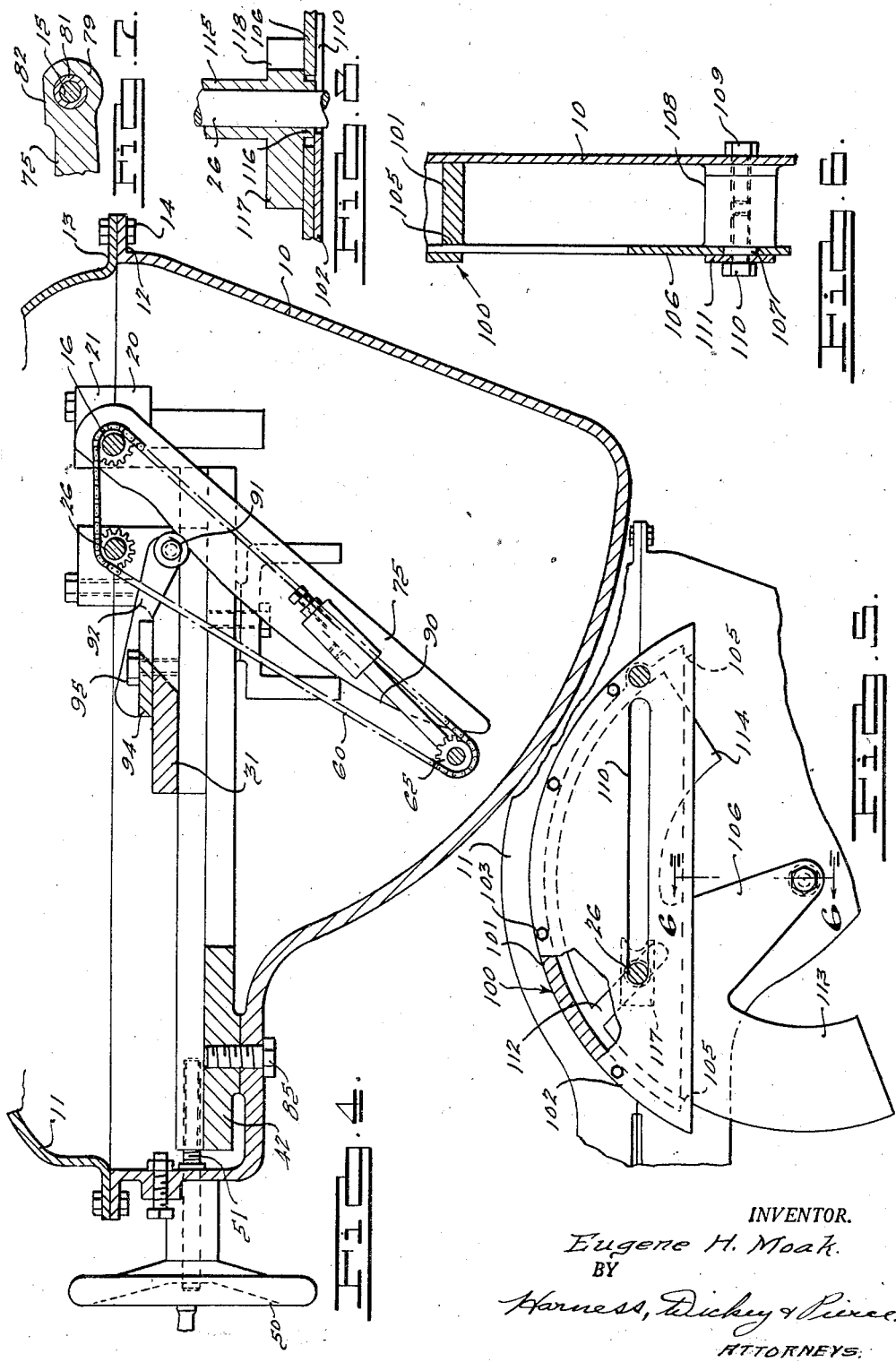
INVENTOR.
Eugene H. Moak.
BY
Harness, Dickey & Pierce
ATTORNEYS.

Patented June 3, 1947

2,421,461

UNITED STATES PATENT OFFICE 2,421,461

MULTIPLE SPINDLE MECHANISM

Eugene H. Moak, Port Huron, Mich., assignor to Moak Machine and Tool Co., Port Huron, Mich., a corporation of Michigan Application August 10, 1945, Serial No. 610,024

12 Claims. (Cl. 74—242.10)

1

The invention relates generally to boring machines and it has particular relation to a multiple spindle type of boring machine.

While the invention relates to a multiple spindle type of machine, it is more particularly related to a machine of this character wherein one spindle is movable relative to the other so that the movable spindle may be moved to a position where it is closely adjacent to the other spindle or to a position substantially separated from such other spindle. Machines having multiple spindles of this character are used especially in furniture or other wood fabricating factories where it is necessary to bore openings in variably spaced relation. Therefore, while the present invention has general use and general application, it perhaps is more especially applicable in the fabrication of furniture or the like.

One object of the present invention is to provide an improved type of multiple spindle machine having one spindle movable towards and from the other, wherein the adjustment of the spindle may be accomplished readily and easily without disturbing the driving relation between the spindles.

Another object of the invention is to provide an improved type of multiple spindle machine, wherein one spindle is driven by means of a chain drive engaging the other spindle and wherein the spindles may be adjusted relatively without disturbing the chain driving engagement between the spindles.

Another object of the invention is to provide a multiple spindle machine of the last mentioned character wherein the chain is automatically maintained in a taut condition during adjustment of the spindles and with the spindles in any adjusted relation.

Another object of the invention is to provide a machine such as mentioned wherein the movable spindle projects through an elongated slot in the machine casing and wherein means are provided for automatically maintaining the slot substantially closed during adjustment of the spindles and after adjustment, except for the opening accommodating the spindle.

Other objects of the invention will become apparent from the following specification, from the drawings relating thereto, and from the claims hereinafter set forth.

For a better understanding of the invention, reference may be had to the accompanying drawings wherein:

Figure 1 is a cross-sectional view of a machine constructed according to one form of the invention, as seen substantially along the line 1—1 of Fig. 3;

Fig. 2 is a cross-sectional view taken substantially along the line 2—2 of Fig. 1;

Fig. 3 is a cross-sectional view taken substantially along the line 3—3 of Fig. 1;

Fig. 4 is a view similar to Fig. 1 illustrating the parts in an intermediate stage of adjustment;

Fig. 5 is a side view of the mechanism showing the slot closing means;

Fig. 6 is a cross-sectional view on a larger scale taken substantially along the line 6—6 of Fig. 5;

Fig. 7 is a cross-sectional view taken substantially along the line 7—7 of Fig. 3; and, Fig. 8 is an enlargement of the structure shown in the circular area indicated at 8 in Fig. 3.

Referring to Figs. 1, 2 and 3 in particular, the mechanism illustrated is mounted in a casing which includes a lower part 10 and an upper part or cover 11. These parts of the casing are provided with mating flanges 12 and 13, respectively, which are secured together at spaced points around the casing by means of bolts 14. A primary drive spindle is indicated at 15 and this spindle extends entirely through the casing and projects beyond opposite sides thereof. One end of the spindle is shown as provided with a suitable collet 16 adapted to hold a boring tool or the like 17, while the other end of the shaft is driven by any suitable power means. For instance, this end of the shaft may have a gear which may be driven by a second gear on the shaft of an electric motor or the like.

The shaft 15 is mounted in laterally spaced bearing supports 18 and 19 at opposite sides of the casing, and each of these supports may comprise a lower part 20 integral with the casing and an upper complimentary part 21 which is fastened to the lower part by means of bolts 22. Suitable roller bearings 23, such as needle bearings, are provided in each of the supports 18 and 19. Also a suitable thrust bearing 24 is provided on a reduced portion 25 of the spindle, and this bearing is held in the support 18 so as to take end thrust on the spindle.

A second spindle indicated at 26 which is parallel to the spindle 15, projects through a slot 27 in the side of the casing and has a suitable collet adapted to hold a second boring tool or the like 28. This second spindle is mounted in bearing supports 29 and 30 carried on opposite sides of a slide 31 located within the casing. Each of the supports 29 and 30, as shown by Figs. 1 and 2, includes a lower part 33 integral with the slide and an upper part 34 secured to the lower part by bolts 35. Suitable bearings such as needle bearings 36, are provided around the spindle within the bearing supports. A suitable end thrust bearing 37 is provided on a reduced portion on the inner end of the spindle 26, and this thrust bearing is held in the support 30 so as to take endwise thrust on the spindle when the boring tool is in operation. Attention is directed to the fact that the inner vertical side walls on the bearing supports on both spindles, as indicated at 39, are substantially tangential to the roller bearings, and this is desirable so as to permit moving the spindle 26 close to the spindle 15.

The slide 31, as best shown by Figs. 1 and 2, is formed with a dovetail slot having upwardly diverging side surfaces 40 and 41, respectively, and such portions of the slide are guided along a a dovetail indicated at 42 which has upwardly inclined side surfaces 43 and 44. Such side surfaces 40 and 43 directly engage each other, but a gib 46 is provided between the surfaces 41 and 44 and has surfaces 47 and 48 mating therewith. The surfaces 40, 43, 41 and 48 are straight and parallel and consequently, the slide 31 will have a straight guideway along which it may be moved. However, the surfaces 44 and 47 are longitudinally angled relative to the other surfaces, as best shown in Fig. 3, and from this it should follow that if the gib is pulled lengthwise, it will bind between the surfaces 41 and 44, and consequently will lock the slide in place. When the gib is lossened slightly, however, the slide may be moved easily.

Locking of the slide in position by moving the gib 46 in this manner can be accomplished by a handwheel 50 on the end of the casing which is connected to a screw 51 in turn threaded into the end of the gib. Movement of the slide 31 along the guideway may be effected by a handwheel 52 which is fastened to a screw 53 extending through the end of the casing and through an opening 54 in the slide. The screw 53 is threaded through a nut 55 which is disposed in an opening 56 in the slide and consequently when the screw is turned, the slide will move. It should now be evident that the slide carrying the spindle 26 may be moved back and forth with respect to the spindle 15 and that it may be positively locked in any position by turning the handwheel 50 so as to pull the gib 46 into wedging relation with the surfaces 41 and 44. An adjustable set screw 58 in the end of the casing is adapted to be engaged by the slide so as to limit movement of the latter and prevent strain on the chain when the wheel 52 is turned.

Driving of the spindle 26 by the spindle 15 is effected by means of a silent chain indicated at 60 which is trained about a sprocket 61 on the drive spindle 16 and about a second sprocket 62 on the spindle 26. This chain necessarily must be long enough to permit the spindle 26 to be moved to its position where it is farthest from the spindle 16, and also it must be taken up when the spindles are close together. In order to take up the slack in the chain at all times, and maintain the chain in a taut condition so that it will be silent and will effect its driving action efficiently and properly, devices are provided which automatically operate as the shaft 26 is adjusted, to take up the slack.

With particular reference to Fig. 1, the chain take up means includes a sprocket 65 which is mounted on the central portion of an idler shaft 66, and this idler shaft, as best shown by Fig. 3, is carried by and projects through openings 68 and 69 in the ends of a pair of legs 70 and 71, respectively. The legs 70 and 71 project respectively through apertured bosses 72 and 73 on the sides of cam arms 74 and 75, and each of the legs is adjustably mounted in its aperture by means of a set screw 76. Also an end thrust screw 77 is threaded into the end of the boss for engagement with the end of the leg so as positively to provide a thrust bearing holding the leg against endwise movement. It follows that any pull by chain on the idler sprocket and idler sprocket shaft will be positively stopped by the thrust means preventing inward movement of the legs 70 and 71.

The two cams arms 74 and 75 are swingable on shaft 15 and have hub shaped ends 78 and 79 provided with bushings 80 and 81 which turnably fit the shaft. Attention is directed at this time to the fact that the hub portions 78 and 79 have portions of their peripheries cut away as indicated at 82 in Fig. 7, and this is desirable so as to permit movement of the spindle 26 to a position close to the spindle 15 without interference on the part of the hubs.

The dovetail element 42 is open at its center so as to permit movement of the cam arms, chain and associated parts but its end portion extends across the end of the casing. At such end the casing is of reduced depth and the central portion of the dovetail is secured to the bottom wall of the casing by means of a bolt 85. The central part of the dovetail is open to accommodate the cam arms and chain and the two side or leg portions of the dovetail are fastened by bolts 87 and 88 to brackets 89 and 90 integral with the casing.

As perhaps best shown by Fig. 4, each of the cam arms 74 and 75 has a cam surface 90 extending along its length, and this cam surface engages a cam follower or roller 91 carried by an arm 92. Two of the arms 92 are thus provided for engagement with the two cam arms 74 and 75, and these two arms 92 are interconnected by cross-plate portion 94, which is fastened by bolts 95 to the slide 31. As the slide 31 moves along, the two rollers 91 bear against and move with the two cam arms.

If it is desired to adjust the spindle 26 with respect to the spindle 15, the wheel 50 is loosened and then the wheel 52 is turned so as to move the slide 31. This adjustment may be accomplished while the spindles are rotating or when stationary and this is particularly desirable because the adjustment can be readily made even while the spindles are rotating at high speed. When the slide is adjusted lengthwise of the casing, the rollers 91 in contact with the cam surfaces 90 will cause the cam arms to move about the axis of the spindle 15 and since the cam arms carry the idler sprocket 65, this sprocket will be swung downwardly as the slide moves. The cam surfaces are so designed or generated that progressively with the movement of the slide the idler sprocket 65 will move in accordance with the variation in chain slack that would otherwise be present, and will maintain the chain in a taut condition at all times.

When the shaft 26 has been moved as near to the shaft 15 as it can be moved, the cam arms will be moved by the cam rollers to positions shown by broken lines in Fig. 1, and it is to be understood that the flats 82 on the hubs 78 and 79 will now be located in vertical positions next to the shaft 26 so as to permit such movement of the shaft 26. The first return movement of the spindle 26 causes the cam arms to follow the cam rollers through pull on the chain, or in other words, the chain will raise the idler sprocket 65 and cause the cam arms to follow the cam rollers. Contact between the cam surfaces and rollers at all times will maintain the chain in properly taut condition.

It has been indicated previously that the movable spindle 26 projects through a slot 27 in the casing sidewall, and it follows that unless some means is provided for closing the slot, dirt may enter the casing and perhaps lubricant escape therefrom. It is desirable therefore to maintain the slot closed even during movement of the spindle.

This result is obtained, as seen in Figs. 3, 5 and 6, by providing an auxiliary casing element 100 on the side of the casing 10 and over the slot 27, and this element includes a plate portion 102 and an endless rim or flange 101 having an upper curved portion and lower straight portion. Bolts 103 secure the casing element 100 to the upper casing part 11. As shown best by Fig. 6, the rim 101 along its lower straight portion has a slot 105 and this slot receives a swingable, segmental plate 106. The plate 106 is pivoted on a smaller end portion 107 of a bushing 108 secured to the casing part 10 by a screw 109 threaded into the opposite end of the bushing. A second screw 110 threaded into said smaller end of the bushing and engaging a washer 111, holds the plate in place. In order to accommodate the movable spindle 26, the auxiliary casing element 100 has a slot 110 aligned with the slot 27 in the casing, and the segmental plate 106 has a slot 112 slightly angled to the radius and this slot receives the spindle 26. It follows that the spindle 26 may travel along the slots 27 and 110. Wings 113 and 114 on the plate 106 cover the slot 110 at all times during the movement of the plate and spindle.

As best shown by Fig. 3, the spindle 26 has a bushing 115 secured in its bearing 29, and this bushing has a short, annular rim 116 which projects into the slot 112 in the segmental plate 106 and substantially corresponds in diameter to the width of such slot. Also the bushing has a head 117 provided with a semi-circular recess 118 which is adaptable to accommodate the spindle 15 when the movable spindle 26 is moved closely adjacent thereto. The short rim 116 on the bushing acts to prevent any direct engagement between the spindle and the segmental plate, and when the spindle 26 is moved, the rim acts to move the segmental plate.

From the foregoing description, it should be evident that when the spindle 26 is adjusted relative to the spindle 15, the bushing 115 carried by the movable spindle will swing the segmental plate 106 with it and cause it to move through the slot 105 while still substantially maintaining the slot closed. During this movement of the spindle 26 and the segmental plate, the slot 110 is closed at all times. It is evident that the segmental plate may be changed in dimensions as may be found most satisfactory and that the slot 112 may be changed in position as desired so as to close all openings around the spindle.

Although only one form of the invention has been illustrated and described in detail, it will be apparent to those skilled in the art that various modifications may be made without departing from the scope of the appended claims.

What is claimed is:

1. A multiple spindle mechanism comprising first and second parallel spindles, bearing means supporting the first spindle, movable bearing means supporting the second spindle so that it may be moved towards and from the first spindle while being maintained parallel thereto, means including a flexible, endless driving element trained about the spindles for driving one by the other, an idler member about which the element also is trained, and cam means for positively moving the idler member in a direction to take up slack when the second spindle is moved towards the first spindle.

2. A multiple spindle mechanism comprising first and second parallel spindles, bearing means supporting the first spindle, movable bearing means supporting the second spindle so that it may be moved towards and from the first spindle while being maintained parallel thereto, means including a flexible, endless driving element trained about the spindles for driving one by the other, an idler member about which the element is also trained, and cam means operating in synchronism with the movement of the second spindle relative to the first spindle for maintaining the element taut during such relative movement of the spindles.

3. A multiple spindle mechanism comprising first and second parallel spindles, bearing means supporting the first spindle, movable bearing means supporting the second spindle so that it may be moved towards and from the first spindle while being maintained parallel thereto, means including a flexible, endless driving element trained about the spindles for driving one by the other, an arm mounted for swinging movement about an axis parallel to the spindles and carrying an idler about which the element is trained, and automatic means for moving the arm so as to maintain the element taut when the second spindle is moved towards the first spindle.

4. A multiple spindle mechanism comprising first and second parallel spindles, bearing means supporting the first spindle, movable bearing means supporting the second spindle so that it may be moved towards and from the first spindle while being maintained parallel thereto, means including a flexible, endless driving element trained about the spindles for driving one by the other, an arm mounted for swinging movement about the axis of the first spindle and carrying an idler wheel about which the element is trained, and cam means for moving the arm to maintain the element taut when the second spindle is moved relative to the first.

5. A multiple spindle mechanism comprising first and second parallel spindles, bearing means supporting the first spindle, movable bearing means supporting the second spindle so that it may be moved towards and from the first spindle while being maintained parallel thereto, means including a flexible, endless driving element trained about the spindles for driving one by the other, an arm mounted for swinging movement about the axis of the first spindle and carrying an idler wheel about which the element is trained, a cam on said arm, and a cam follower carried with the movable bearing means and engaging the cam so as to move the arm and idler according to the contour of the cam.

6. A multiple spindle mechanism comprising first and second parallel spindles, sprockets on both spindles, an endless chain trained about the sprockets, bearing means for supporting the first spindle, movable bearing means for supporting the second spindle, an idler sprocket also engaged by the chain, and cam means governed by movement of the movable bearing means for moving the idler sprocket so as to keep the chain taut during such movement of the movable bearing means.

7. A multiple spindle mechanism comprising first and second parallel spindles, sprockets on both spindles, an endless chain trained about the sprockets, bearing means for supporting the first spindle, movable bearing means for supporting the second spindle, an arm swingable about the axis of the first spindle, a sprocket carried by said arm and engaging the chain, means for adjustably moving the movable bearing means, and means for automatically moving the arm about its axis during adjustment of the movable bearing means so as to cause the chain to remain taut.

8. A multiple spindle mechanism comprising first and second parallel spindles, sprockets on both spindles, an endless chain trained about the sprockets, bearing means for supporting the first spindle, movable bearing means for supporting the second spindle, an arm swingable about the axis of the first spindle, an idler sprocket carried by said arm and engaging the chain, a cam surface extending along the arm, and a cam follower carried by the movable bearing means and engaging the cam surface, said surface being so shaped as to cause such movement of the arm and idler sprocket as to maintain the chain taut.

9. A multiple spindle mechanism comprising first and second parallel spindles, bearing means supporting the first spindle, movable bearing means supporting the second spindle so that it may be moved towards and from the first spindle while being maintained parallel thereto, means including a flexible, endless driving element trained about the spindles for driving one by the other, cam means for positively taking up slack in the element when the second spindle is moved towards the first spindle, and means for adjustably moving the second spindle and holding it in any position of adjustment.

10. A multiple spindle mechanism comprising first and second parallel spindles, bearing means supporting the first spindle, movable bearing means supporting the second spindle so that it may be moved towards and from the first spindle while being maintained parallel thereto, means including a flexible, endless driving element trained about the spindles for driving one by the other, an arm swingable about the axis of the first spindle, an idler sprocket carried by the outer end of the arm and engaging the driving element, a cam surface extending along the arm, a cam follower carried by the movable bearing means for engaging the cam surface, and means for adjustably moving the movable bearing means and for holding it in any position of adjustment, the cam surface being so shaped as to cause such movement of the arm and idler sprocket as to maintain the chain taut.

11. A multiple spindle mechanism comprising a casing, first and second parallel spindle shafts extending from one side of the casing, bearing means for the first shaft, movable bearing means for the second shaft so as to enable adjusting the second shaft towards and from the first shaft, said casing having a slot allowing adjustment of the second shaft relative to the first, and movable plate means operable to maintain the slot closed during said adjustment except for an opening through which the ssecond spindle shaft projects.

12. A multiple spindle mechanism comprising a casing, first and second parallel spindle shafts extending from one side of the casing, bearing means for the first shaft, movable bearing means for the second shaft so as to enable adjusting the second shaft towards and from the first shaft, said casing having a slot allowing adjustment of the second shaft relative to the first, and movable plate means operable to maintain the slot closed during said adjustment except for an opening through which the second spindle shaft projects, said plate means comprising a swingable plate having a slot traversing the first slot and receiving the spindle.

EUGENE H. MOAK.

REFERENCES CITED

The following references are of record in the file of this patent:

UNITED STATES PATENTS

| Number | Name | Date |
|---|---|---|
| 1,808,588 | Allen | June 2, 1931 |
| 743,730 | Kirk | Nov. 10, 1903 |